United States Patent  
Kurosaki

(10) Patent No.: US 11,440,414 B2
(45) Date of Patent: Sep. 13, 2022

(54) ELECTRIC VEHICLE

(71) Applicant: TOYOTA JIDOSHA KABUSHIKI KAISHA, Toyota (JP)

(72) Inventor: Shin Kurosaki, Toki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 420 days.

(21) Appl. No.: 16/666,557

(22) Filed: Oct. 29, 2019

(65) Prior Publication Data

US 2020/0139819 A1 May 7, 2020

(30) Foreign Application Priority Data

Nov. 1, 2018 (JP) .............................. JP2018-206893

(51) Int. Cl.
*B60L 7/26* (2006.01)
*B60L 7/18* (2006.01)

(52) U.S. Cl.
CPC .. *B60L 7/26* (2013.01); *B60L 7/18* (2013.01)

(58) Field of Classification Search
None
See application file for complete search history.

(56) References Cited

U.S. PATENT DOCUMENTS

2004/0070269 A1* 4/2004 Anwar ................. B60T 13/586
303/152
2010/0105520 A1* 4/2010 Ohbayashi ............ B60L 50/16
477/23

FOREIGN PATENT DOCUMENTS

| JP | H04-067167 U | 6/1992 |
|----|--------------|--------|
| JP | 2003-072402 A | 3/2003 |
| JP | 2004-236386 A | 8/2004 |
| JP | 2009-023568 A | 2/2009 |
| JP | 2011-063145 A | 3/2011 |
| JP | 2018-023212 A | 2/2018 |

* cited by examiner

Primary Examiner — Todd Melton
Assistant Examiner — Jason R Roberson
(74) Attorney, Agent, or Firm — Oliff PLC

(57) ABSTRACT

An electric vehicle without a propeller shaft including a rotating machine selectively functioning as an electric motor and a generator, configured to serve as a drive force source in the vehicle when the rotating machine functions as the electric motor, and functioning as the generator during running of the vehicle to thereby generate a regenerative brake force, and a wheel brake disposed on a wheel, used as a service brake, and generating a braking force corresponding to a brake request amount during running of the vehicle, the electric vehicle comprising: a third braking device disposed in a power transmission path between the rotating machine and a drive wheel to generate a braking force with a braking method other than regeneration during running of the vehicle.

7 Claims, 5 Drawing Sheets

ELECTRIC VEHICLE

This application claims priority from Japanese Patent Application No. 2018-206893 filed on Nov. 1, 2018, the disclosure of which is herein incorporated by reference in its entirety.

FIELD OF THE INVENTION

The present invention relates to an electric vehicle and, more particularly, to an electric vehicle causing a rotating machine disposed as a drive force source for running to function as a generator so as to generate a regenerative brake force.

DESCRIPTION OF THE RELATED ART

There is known an electric vehicle, which does not include a propeller shaft, having (a) a rotating machine selectively functioning as an electric motor and a generator, configured to serve as a drive force source in the vehicle when the rotating machine functions as the electric motor, and functioning as the generator during running of the vehicle to thereby generate a regenerative brake force, and (b) a wheel brake disposed on a wheel, used as a service brake, and generating a braking force corresponding to a brake request amount during running of the vehicle. The vehicle described in Patent Document 1 is an example thereof and includes a third braking device (braking force generating means), such as an engine brake and an air resistance variable means such as a rear wing including an angle adjustable flap, in addition to a regenerative brake using a rotating machine and a wheel brake.

PRIOR ART DOCUMENT

Patent Document

Patent Document 1: Japanese Laid-Open Patent Publication No. 2009-23568

SUMMARY OF THE INVENTION

Technical Problem

However, for example, in an electric vehicle which does not include an engine in a power transmission path, engine brake cannot be obtained, and therefore, for example, when the regenerative brake using the rotating machine cannot be used due to battery charge restriction, etc., the wheel brake is frequently used and may cause a problem of overheating etc. It is conceivable that an air resistance variable means or a road surface resistance variable means is used instead of the engine brake; however, this may be difficult to apply because of a large scale of equipment and a significant design change required for some vehicles. An electric vehicle including an engine in a power transmission path has the same problem when the engine brake cannot be used for some reason.

The present invention was conceived in view of the situations and it is therefore an object of the present invention to provide an electric vehicle in which a third braking device can easily be disposed for suppressing frequent use of a wheel brake when a regenerative brake using a rotating machine is unusable.

Solution to Problem

To achieve the above object, a first aspect of the present invention provides an electric vehicle without a propeller shaft including (a) a rotating machine selectively functioning as an electric motor and a generator, configured to serve as a drive force source in the vehicle when the rotating machine functions as the electric motor and configured to generate a regenerative brake force when the rotating machine functions as the generator, and (b) a wheel brake disposed on a wheel, used as a service brake, and generating a braking force corresponding to a brake request amount during running of the vehicle, the electric vehicle comprising: (c) a third braking device disposed in a power transmission path between the rotating machine and a drive wheel to generate a braking force with a braking method other than regeneration during running of the vehicle.

A second aspect of the present invention provides the electric vehicle recited in the first aspect of the invention, wherein (a) the electric vehicle includes a speed reducing mechanism reducing a speed of rotation of an output shaft of the rotating machine and transmitting the rotation to a differential device, and wherein (b) the third braking device is disposed on the output shaft and applies a braking force to the output shaft.

A third aspect of the present invention provides the electric vehicle recited in the first aspect of the invention, wherein (a) the electric vehicle comprises an electric drive unit including a differential device disposed parallel to an output shaft of the rotating machine, a speed reducing mechanism which reduces and transmits a rotation of the output shaft to a speed reduction shaft and further reduces and transmits a rotation of the speed reduction shaft to the differential device, and a casing housing the differential device and the speed reducing mechanism together with the rotating machine, and wherein (b) the third braking device is disposed on the output shaft and applies a braking force to the output shaft.

A fourth aspect of the present invention provides the electric vehicle recited in the first aspect of the invention, wherein (a) the electric vehicle comprises an electric drive unit including a differential device disposed parallel to an output shaft of the rotating machine, a speed reducing mechanism which reduces and transmits a rotation of the output shaft to a speed reduction shaft and further reduces and transmits a rotation of the speed reduction shaft to the differential device, and a casing housing the differential device and the speed reducing mechanism together with the rotating machine, and wherein (b) the third braking device is disposed on the speed reduction shaft and applies a braking force to the speed reduction shaft.

A fifth aspect of the present invention provides the electric vehicle recited in any one of the first to fourth aspects of the invention, wherein the third braking device is an electromagnetic retarder generating a braking force from an eddy current generated by an electromagnetic induction action.

A sixth aspect of the present invention provides the electric vehicle recited in any one of the first to fifth aspects of the invention, comprising a brake control device determining whether a regenerative control of the rotating machine is available and controlling the rotating machine and the third braking device such that the rotating machine generates the regenerative brake force when the regenerative control is available and that the third braking device generates the braking force when the regenerative control is unavailable.

Advantageous Effects of Invention

According to the electric vehicle as described above, the third braking device is disposed in the power transmission path between the rotating machine and drive wheels to generate the braking force based on the braking method other than regeneration, and therefore, even when the regenerative brake of the rotating machine is unusable due to battery charge restriction etc., frequent use of the wheel brake can be suppressed by operating the third braking device. Since the third braking device is disposed in the power transmission path between the rotating machine and the drive wheels, the third braking device can easily be disposed without requiring a significant design change as compared to when an air resistance variable means or a road surface resistance variable means is disposed.

According to the electric vehicle recited in the second and third aspects of the invention, the rotation of the output shaft of the rotating machine is reduced by the speed reducing mechanism and transmitted to the differential device, and since the third braking device is disposed on the output shaft of the rotating machine before the speed reduction, the braking torque of the third braking device may be relatively small, so that the small-sized third braking device can be compactly disposed. The third aspect of the invention includes the electric drive unit in which the speed reduction shaft of the speed reducing mechanism and the differential device are arranged parallel to the output shaft of the rotating machine, and for example, the output shaft of the rotating machine can be extended and projected from the casing with the third braking device disposed on a projecting end portion of the output shaft or the third braking device can be disposed in the casing. Thus, the electric drive unit is more easily employed in the electric vehicle than known electric drive units.

According to the fourth aspect of the invention, in the case that the electric vehicle comprises the electric drive unit in which the speed reduction shaft of the speed reducing mechanism and the differential device are arranged parallel to the output shaft of the rotating machine, since the third braking device is disposed on the speed reduction shaft, the rotation speed of the third braking device is reduced as compared to when the third braking device is disposed on the output shaft of the rotating machine as in the third aspect of the invention, and the rotation balance is improved so that rotation vibration etc. are suppressed. The speed reduction shaft can be extended and projected from the casing with the third braking device disposed on a projecting end portion of the speed reduction shaft or the third braking device can be disposed in the casing. Thus, the electric drive unit is more easily employed in the electric vehicle than known electric drive units, which is the same as the third aspect of the invention.

According to the electric vehicle recited in the fifth aspect of the invention, since the electromagnetic retarder is disposed as the third braking device, a fluid is not required as in the case of a fluid type retarder or a hydraulic brake device, so that the electromagnetic retarder can more easily be disposed.

According to the electric vehicle recited in the sixth aspect of the invention, the availability of the regenerative control of the rotating machine is determined so that the rotating machine and the third braking device are controlled such that the rotating machine generates the regenerative brake force if the regenerative control is available, and that the third braking device generates the braking force if the regenerative control is unavailable, and therefore, if the regenerative control of the rotating machine is unavailable due to charge restriction of the battery etc., the third braking device is operated and the frequent use of the wheel brake can appropriately be suppressed.

MODES FOR CARRYING OUT THE INVENTION

Figure 1:
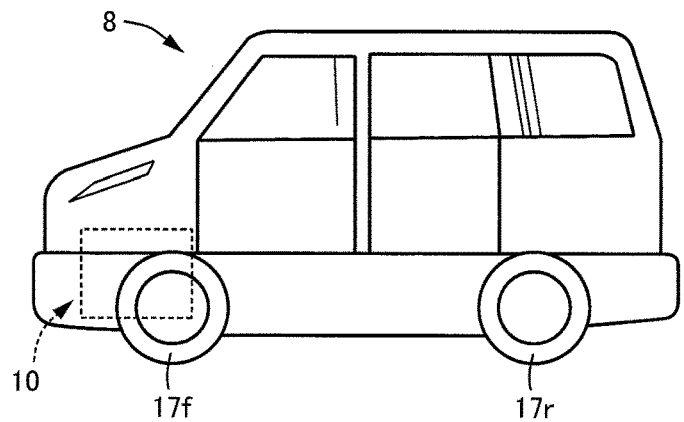
FIG. 1 is a schematic left side view of an electric vehicle of a front-mounted drive force source type that is an example of the present invention as viewed from the left side.

The present invention relates to an electric vehicle having a rotating machine selectively functioning as an electric motor and a generator and is suitably applied to an electric vehicle using only a rotating machine for running; however, the present invention may be applied to a series hybrid vehicle including an engine (internal combustion engine) dedicated to electric generation and a parallel hybrid vehicle in which an engine is used as a drive force source, for example. The electric vehicle may use only a vehicle-mounted battery as an electric power source for running or may be equipped with an electric power generating device such as a fuel cell.

The present invention is suitably applied to a transversely-mounted electric drive unit mounted on a vehicle in a posture in which an output shaft of a rotating machine is disposed on a first axis and a differential device is disposed on a second axis parallel to the first axis such that these axes are parallel to a vehicle width direction, and may also be applied to a longitudinally-mounted electric drive unit mounted on the vehicle in a posture in which the output shaft of the rotating machine is parallel to a vehicle longitudinal direction. Therefore, the posture of the output shaft of the rotating machine is not particularly limited as long as the vehicle is an electric vehicle without a propeller shaft. A bevel gear type or planetary gear type differential gear device is suitable for the differential device; however, for example, if the vehicle is provided with a pair of clutches configured to control a power transmission state in accordance with left and right drive wheels, the pair of clutches can be regarded as the differential device. If the left and right drive wheels are rotationally driven by respective different rotating machines, the differential device is not necessary and, in that case, a third braking device may be disposed in each of power transmission paths between the left and right drive wheels and the rotating machines.

A speed reducing mechanism or a speed increasing mechanism is disposed between the output shaft of the rotating machine and the differential device as necessary. The speed reducing mechanism may be a speed reducing mechanism reducing speed at a constant speed reduction ratio, such as a parallel shaft type or a planetary gear type mechanism, for example, or may be a step-variable transmission establishing a plurality of gear positions different in speed change ratio with engagement devices such as clutches and brakes, or a belt type continuously variable transmission etc.

A wheel brake is mechanically coupled to a brake pedal stepped by a driver, for example, and is configured to mechanically generate a braking force corresponding to a stepping operation force thereof (brake request amount), or may have a braking force electrically controlled by a brake control device in accordance with the stepping operation force etc. For example, during auto-cruise running in which the vehicle automatically runs at a constant vehicle speed or automatically runs while following a preceding vehicle, the braking force may electrically be controlled by the brake control device in accordance with the brake request amount calculated for deceleration.

Although an electromagnetic retarder is suitably used for the third braking device, various braking devices braking based on a braking method other than regeneration can be employed such as a fluid type retarder and a friction engagement type hydraulic brake device. In the case of the electromagnetic retarder generating a braking force with an electromagnet, the braking force can be increased or decreased by controlling an excitation current of the electromagnet. The electromagnetic retarder may generate a braking force by using a permanent magnet instead of the electromagnet or in addition to the electromagnet. The third braking device is preferably a braking device capable of increasing and decreasing the braking force; however, a braking device unable to increase and decrease the braking force is also usable.

EXAMPLE

An example of the present invention will now be described in detail with reference to the drawings. In the following example, the figures are simplified or deformed as needed and portions are not necessarily precisely drawn in terms of dimension ratio, shape, etc.

First Example

Figure 2:
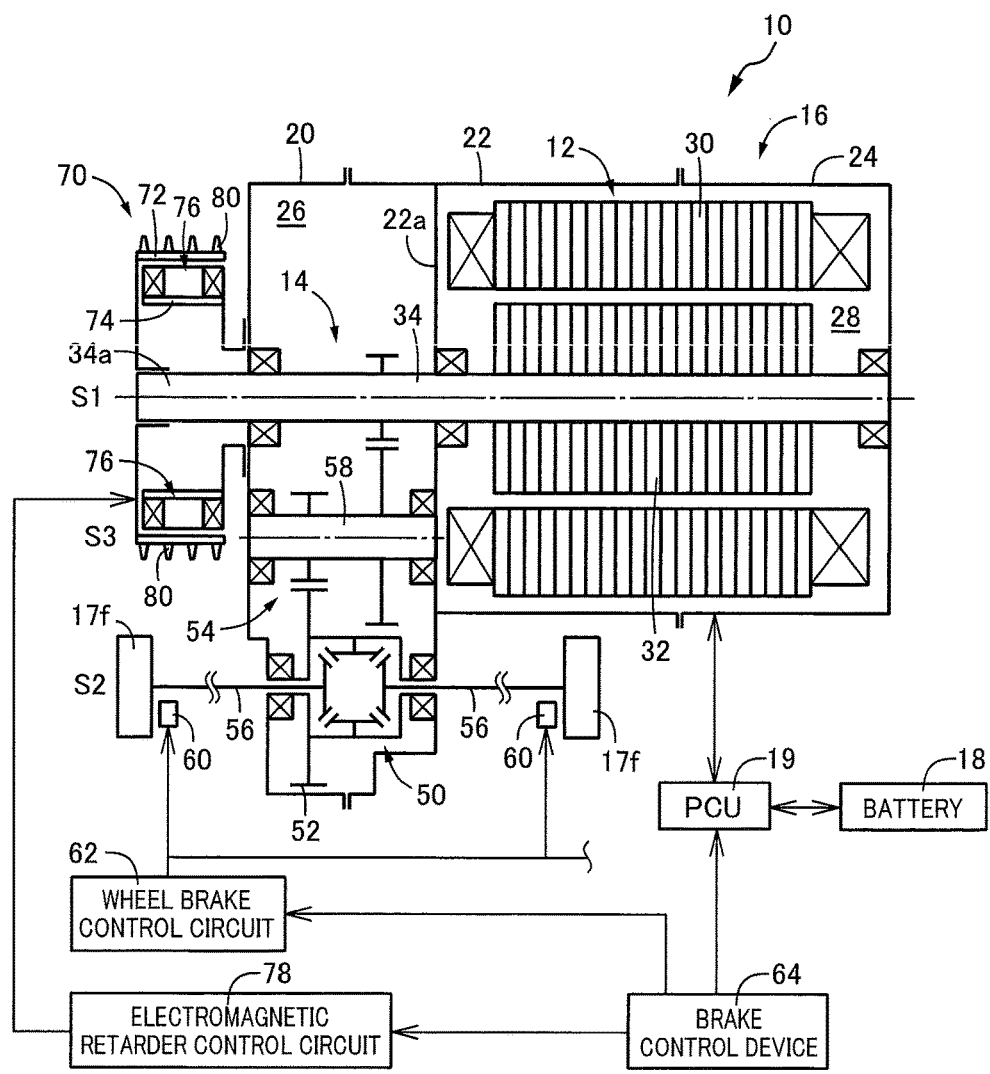
FIG. 2 is a diagram for explaining a schematic configuration of an electric drive unit mounted on the electric vehicle of FIG. 1, including a cross-sectional view taken along a vehicle width direction and showing multiple axes developed and arranged in one plane and a diagram showing a main portion of a control system.

FIG. 1 is a schematic left side view of an electric vehicle 8 that is an example of the present invention as viewed from the left side. FIG. 2 is a diagram for explaining a schematic configuration of an electric drive unit 10 mounted on the electric vehicle 8, including a cross-sectional view taken along a vehicle width direction and showing multiple axes (a first axis S1 to a third axis S3) developed and arranged in one plane and a diagram showing a main portion of a control system. The electric drive unit 10 includes a rotating machine 12 disposed on the first axis S1 and used as a drive force source, a transaxle 14 adjacently disposed on one end side of the rotating machine 12 side by side in a first axis S1 direction, and a casing 16 housing the rotating machine 12 and the transaxle 14. The electric drive unit 10 is a transversely-mounted unit mounted on the electric vehicle 8 in such a posture that the first axis S1 is parallel to the vehicle width direction and is disposed in a front portion of the electric vehicle 8 to rotationally drive front wheels 17f. Therefore, the electric vehicle 8 of this example is a front-wheel drive vehicle of a front-mounted drive force source type in which the electric drive unit 10 is disposed in the front portion of the vehicle to rotationally drive the front wheels 17f for running. The electric drive unit 10 of this example can be disposed in a rear portion of the electric vehicle 8 to form a rear-wheel drive vehicle of a rear-mounted drive force source type in which left and right rear wheels 17r are rotationally driven for running.

The electric vehicle 8 is an electric vehicle including only a single rotating machine 12 as a drive force source, and a predetermined high voltage electric power is supplied from a battery 18 through a power control unit (PCU) 19 such as an inverter to the rotating machine 12. The rotating machine 12 is a so-called motor generator selectively functioning as an electric motor and a generator and is subjected to a regenerative control during running of the vehicle 8 to function as a generator, thereby generating a regenerative brake force. The battery 18 may be mounted alone or may be provided with a power generator such as a fuel cell as necessary and may be charged with electric power supplied from the power generator as needed. For example, the power generator may be a generator rotationally driven by an engine as in a series hybrid vehicle.

The casing 16 includes a bottomed cylindrical gear casing portion 20, a cylindrical first motor casing portion 22, and a bottomed cylindrical second motor casing portion 24. The first motor casing portion 22 is integrally provided with a partition wall 22a extending to the inner circumferential side, and one opening portion of the first motor casing portion 22 is integrally coupled to an opening portion of the gear casing portion 20 by a bolt etc. so that a gear chamber 26 is formed between the gear casing portion 20 and the partition wall 22a, and the transaxle 14 is housed in the gear chamber 26. The transaxle 14 corresponds to a power transmission mechanism transmitting an output of the rotating machine 12 to the front wheels 17f.

An opening portion of the second motor casing 24 is integrally coupled to the other opening portion of the first motor casing 22 by bolts etc., and a motor chamber 28 housing the rotating machine 12 is formed inside. The rotating machine 12 is a synchronous motor and includes a stator 30 and a rotor 32 having an annular shape concentric with the first axis S1, and the rotor 32 has a diameter smaller than the stator 30 and is disposed inside the stator 30 with an output shaft 34 disposed in a central portion. The output shaft 34 is made up of multiple members coupled by splines etc. as necessary. The stator 30 is integrally fixed to the partition wall 22a of the first motor casing portion 22 by multiple bolts not shown, while the output shaft 34 is supported rotatably around an axis coincident with the first axis S1 by the casing 16 via multiple bearings. The first axis S1 corresponds to a rotating machine center line that is a center line of the rotating machine 12.

The transaxle 14 includes a differential device 50 disposed on the second axis S2 parallel to the first axis S1, and a gear type speed reducing mechanism 54 transmitting power between the output shaft 34 of the rotating machine 12 and a ring gear 52 of the differential device 50. The gear type speed reducing mechanism 54 is a parallel shaft type gear mechanism reducing a speed of rotation of the output shaft 34 and transmitting the rotation to the differential device 50 and includes a reduction gear shaft 58 provided with a reduction large gear and a reduction small gear. The reduction gear shaft 58 is disposed on the third axis S3 parallel to the first axis S1 and the second axis S2 such that the speed of the rotation of the output shaft 34 is reduced and transmitted and further reduces the speed of the rotation before transmission to the ring gear 52 of the differential device 50. The differential device 50 is a bevel gear type differential mechanism and transmits the power transmitted to the ring gear 52, from a pair of side gears via a pair of left and right drive shafts 56 to the left and right front wheels 17f. Therefore, the electric vehicle 8 of this example is an electric vehicle without a propeller shaft in which the power is directly transmitted from the gear type speed reducing mechanism 54 to the differential device 50. The gear type speed reducing mechanism 54 corresponds to a speed reducing mechanism, and the reduction gear shaft 58 corresponds to a speed reduction shaft.

A wheel brake 60 used as a service brake is attached to each of the front wheels 17f and the rear wheels 17r of the electric vehicle 8 as described above. The wheel brake 60 is a hydraulic brake frictionally engaged by hydraulic pressure and generates a braking force corresponding to a brake hydraulic pressure supplied from a wheel brake control circuit 62 during running of the vehicle 8. The wheel brake control circuit 62 is a hydraulic circuit having an electric oil pump, a hydraulic control valve, etc., and supplies the wheel brake 60 with the brake hydraulic pressure for generating a predetermined braking force corresponding to a brake request amount when the hydraulic control valve etc. are controlled in accordance with a command signal supplied from a brake control device 64. The brake request amount is a stepping operation force of a brake pedal (not shown) subjected to a stepping operation by a driver, for example. The brake control device 64 is a controller controlling the braking force of the vehicle 8 including the wheel brake 60, is configured to include a so-called microcomputer etc., calculates the brake hydraulic pressure in accordance with the brake request amount based on a predetermined data map etc., and controls the hydraulic control valve etc. of the wheel brake control circuit 62 so that the brake hydraulic pressure is output. The brake hydraulic pressure may mechanically be generated in accordance with the stepping operation force of the brake pedal, and, in this case, the wheel brake control circuit 62 controlling the brake hydraulic pressure and the control of the brake hydraulic pressure by the brake control device 64 can be eliminated.

The brake control device 64 also controls the power control unit 19 of the rotating machine 12 to provide a regenerative control so that the rotating machine 12 functions as a generator during running of the vehicle and thereby generates a regenerative brake force. Specifically, to suppress frequent use of the wheel brake 60 on a downhill etc., the regenerative control of the rotating machine 12 is provided to generate the regenerative brake force when the driver performs a manual operation for requesting an auxiliary brake (corresponding to an engine brake of an engine-drive vehicle) or when the necessity of the auxiliary brake is automatically determined from a state of use of the wheel brake 60, road information, etc. The magnitude of braking force of the auxiliary brake can manually be set and changed by the driver or is automatically set and changed in accordance with a state of use of the wheel brake 60, road information, etc.

The electric vehicle 8 is provided with an electromagnetic retarder 70 as a third braking device usable as the auxiliary brake in addition to the wheel brake 60 and a regenerative brake through the regenerative control of the rotating machine 12. The electromagnetic retarder 70 generates a braking force from an eddy current generated by an electromagnetic induction action and is attached to the output shaft 34. One end portion 34a of the output shaft 34, i.e., the end portion on the transaxle 14 side, or the end portion on the left side in FIG. 2, is extended to project from the gear casing portion 20 of the casing 16 to the outside, and the electromagnetic retarder 70 is attached to the end portion 34a. The electromagnetic retarder 70 includes a cylindrical rotating-side member 72 relatively non-rotatably coupled to the end portion 34a via a rotation stopper such as splines and a cylindrical fixed-side member 74 disposed on the inner circumferential side of the rotating-side member 72 and fixed to the gear casing portion 20, and the members are both disposed concentrically with the first axis S1. The fixed-side member 74 has a multiplicity of electromagnets 76 arranged in a circumferential direction of the fixed-side member 74 to face an inner circumferential surface of the rotating-side member 72 across a slight gap (clearance), and an excitation current of the electromagnets 76 is controlled by an electromagnetic retarder control circuit 78, so that the rotation of the rotating-side member 72 is braked with a braking force corresponding to the excitation current, and the rotation of the output shaft 34 and therefore the front wheel 17f is accordingly braked. The excitation current output from the electromagnetic retarder control circuit 78 is controlled in accordance with a command signal supplied from the brake control device 64. An outer circumferential surface of the rotating-side member 72 is provided with a multiplicity of cooling fins 80 projecting to the outer circumferential side. In this example, the rotating-side member 72 and the electromagnets 76 are disposed to face each other across the cylindrical gap around the first axis S1; however, the rotating-side member 72 and the electromagnets 76 can be arranged side by side substantially parallel to each other in the axial direction of the first axis S1 to face each other across a disk-shaped gap orthogonal to the first axis S1. Alternatively, the electromagnets 76 can be disposed on the rotating-side member 72, and various other forms of electromagnetic retarders can be employed.

Figure 3:
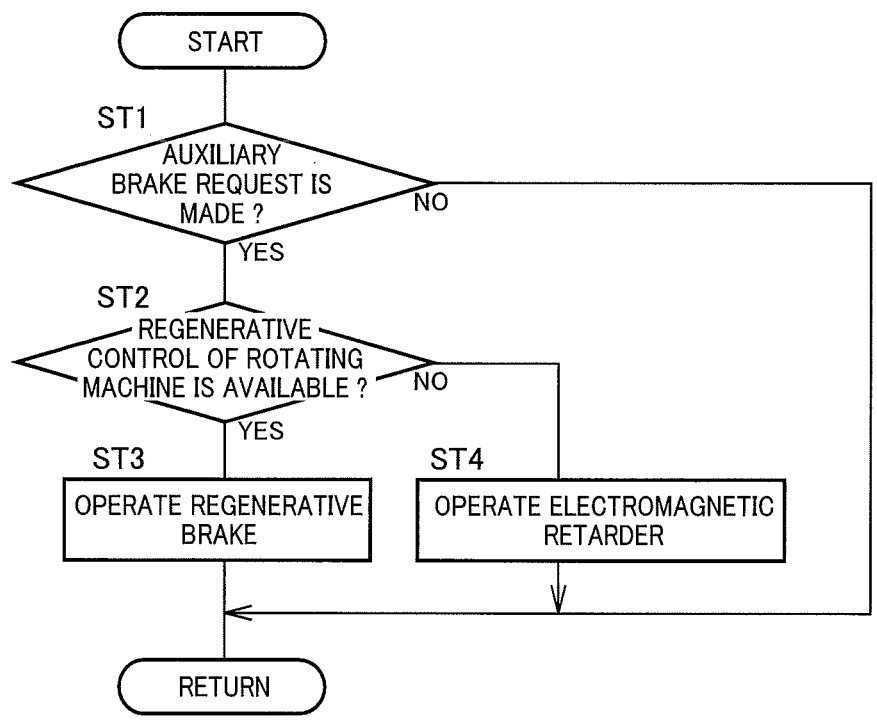
FIG. 3 is a flowchart for explaining an auxiliary brake control provided by a brake control device of FIG. 2.

In the electric vehicle 8 as described above, the electromagnetic retarder 70 can be used as the auxiliary brake for suppressing frequent use of the wheel brake 60 on a downhill etc., in addition to the regenerative brake through the regenerative control of the rotating machine 12. The brake control device 64 provides an auxiliary brake control in accordance with a flowchart of FIG. 3, for example, and thereby selectively uses the rotating machine 12 and the electromagnetic retarder 70. At step ST1 of FIG. 3, it is determined whether an auxiliary brake request is made, and if an auxiliary brake request is not made, the control is terminated, or if an auxiliary brake request is made, step ST2 and subsequent steps are executed. The auxiliary brake request is made when the auxiliary brake is requested by a driver's manual operation or when the necessity of the auxiliary brake is determined based on a state of use of the wheel brake 60, road information, etc., and a magnitude of the braking force of the auxiliary brake is determined at the same time.

At step ST2, it is determined whether the regenerative control of the rotating machine 12 is available, based on whether a predefined regenerative control provision permission condition is satisfied, for example. The regenerative control provision permission condition is, for example, that a remaining electric storage amount SOC of the battery 18 is equal to or less than a predefined chargeable upper limit value, that a battery temperature is equal to or greater than a predefined chargeable/dischargeable lower limit value, etc. Specifically, when the regenerative control of the rotating machine 12 is provided to generate the regenerative brake force, the battery 18 must be charged with electricity generated by the regenerative control, and therefore, if the remaining electric storage amount SOC exceeds the upper limit value, the regenerative control of the rotating machine 12 is unavailable. If the battery temperature falls below the lower limit value and the charge/discharge of the battery 18 is restricted, the regenerative control of the rotating machine 12 is unavailable since the battery 18 cannot be charged.

If the regenerative control of the rotating machine 12 is available, step ST3 is executed to use the rotating machine 12 as the auxiliary brake, and the rotating machine 12 is subjected to the regenerative control to generate a predetermined regenerative brake force. At step ST3, the electromagnetic retarder 70 can be used in addition to the rotating machine 12 so that a predetermined braking force is generated by using both. If the regenerative control of the rotating machine 12 is unavailable, step ST4 is executed to use the electromagnetic retarder 70 as the auxiliary brake, and the electromagnets 76 of the electromagnetic retarder 70 are excited to generate a predetermined braking force.

As described above, according to the electric vehicle 8 of this example, the electromagnetic retarder 70 is disposed as the third braking device in a power transmission path between the rotating machine 12 and the front wheels 17f serving as drive wheels, and therefore, even when the regenerative brake of the rotating machine 12 is unusable due to charge restriction of the battery 18 etc., the frequent use of the wheel brake 60 can be suppressed by operating the electromagnetic retarder 70.

Since the electromagnetic retarder 70 is disposed in the power transmission path between the rotating machine 12 and the front wheels 17f, the electromagnetic retarder 70 can easily be disposed without requiring a significant design change as compared to when an air resistance variable means or a road surface resistance variable means is disposed. The electric vehicle 8 of this example includes the electric drive unit 10 in which the reduction gear shaft 58 of the gear type speed reducing mechanism 54 and the differential device 50 are arranged parallel to the output shaft 34 of the rotating machine 12, and the output shaft 34 is extended to project from the casing 16 to the outside with the electromagnetic retarder 70 attached to the end portion 34a. Thus, the electric drive unit 10 is more easily employed in the electric vehicle 8 than known electric drive units.

The rotation of the output shaft 34 of the rotating machine 12 is reduced by the gear type speed reducing mechanism 54 and transmitted to the differential device 50, and since the electromagnetic retarder 70 is disposed on the output shaft 34 before the speed reduction, the braking torque of the electromagnetic retarder 70 may be relatively small, so that the small-sized electromagnetic retarder 70 can be used and compactly disposed.

Since the electromagnetic retarder 70 is disposed as the third braking device, a fluid is not required as in the case of a fluid type retarder or a hydraulic brake device, so that the electromagnetic retarder 70 can more easily be disposed.

The availability of the regenerative control of the rotating machine 12 is determined so that the rotating machine 12 and the electromagnetic retarder 70 are controlled so as to generate the regenerative brake force by using the rotating machine 12 as the auxiliary brake if the regenerative control is available, or to generate the braking force by using the electromagnetic retarder 70 as the auxiliary brake if the regenerative control is unavailable, and therefore, if the regenerative control of the rotating machine 12 is unavailable due to charge restriction of the battery 18 etc., the electromagnetic retarder 70 is operated and the frequent use of the wheel brake 60 can appropriately be suppressed.

Other examples of the present invention will be described. In the following examples, portions substantially common to the examples are denoted by the same reference numerals and will not be described in detail.

Second Example

Figure 4:
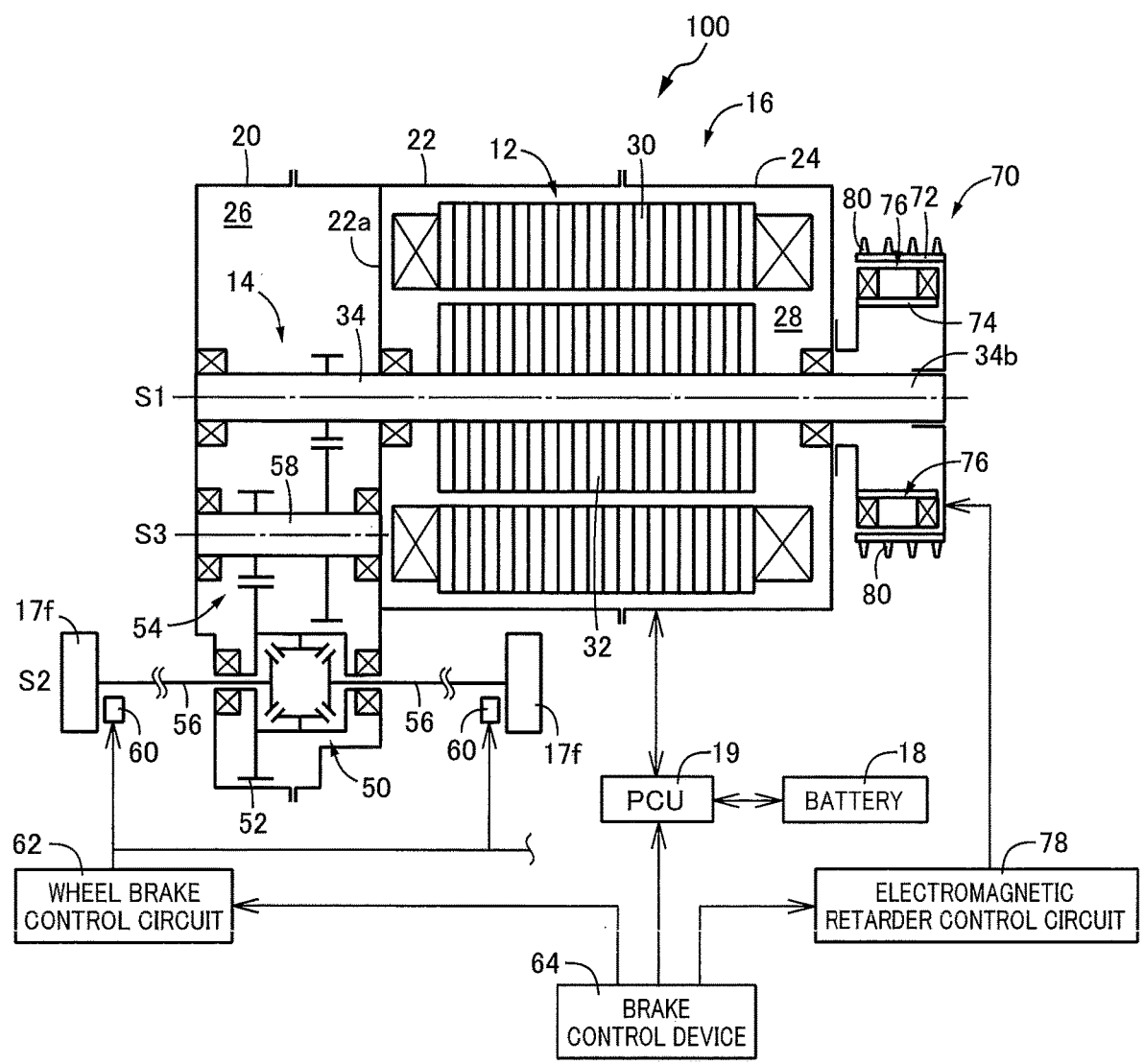
FIG. 4 is a diagram for explaining another example of the present invention, corresponding to FIG. 2.

An electric drive unit 100 of FIG. 4 is different from the electric drive unit 10 of the first example in the arrangement position of the electromagnetic retarder 70 serving as the third braking device. Specifically, the second example is the same in terms of the fact that the electromagnetic retarder 70 is attached to the output shaft 34 of the rotating machine 12; however, the other end portion 34b of the output shaft 34, i.e., the end portion on the rotating machine 12 side, or the end portion on the right side in FIG. 4, is extended to project from the second motor casing portion 24 of the casing 16 to the outside, and the electromagnetic retarder 70 is attached to the end portion 34b. Even in the second example, the same effects as the first example can be obtained.

Third Example

Figure 5:
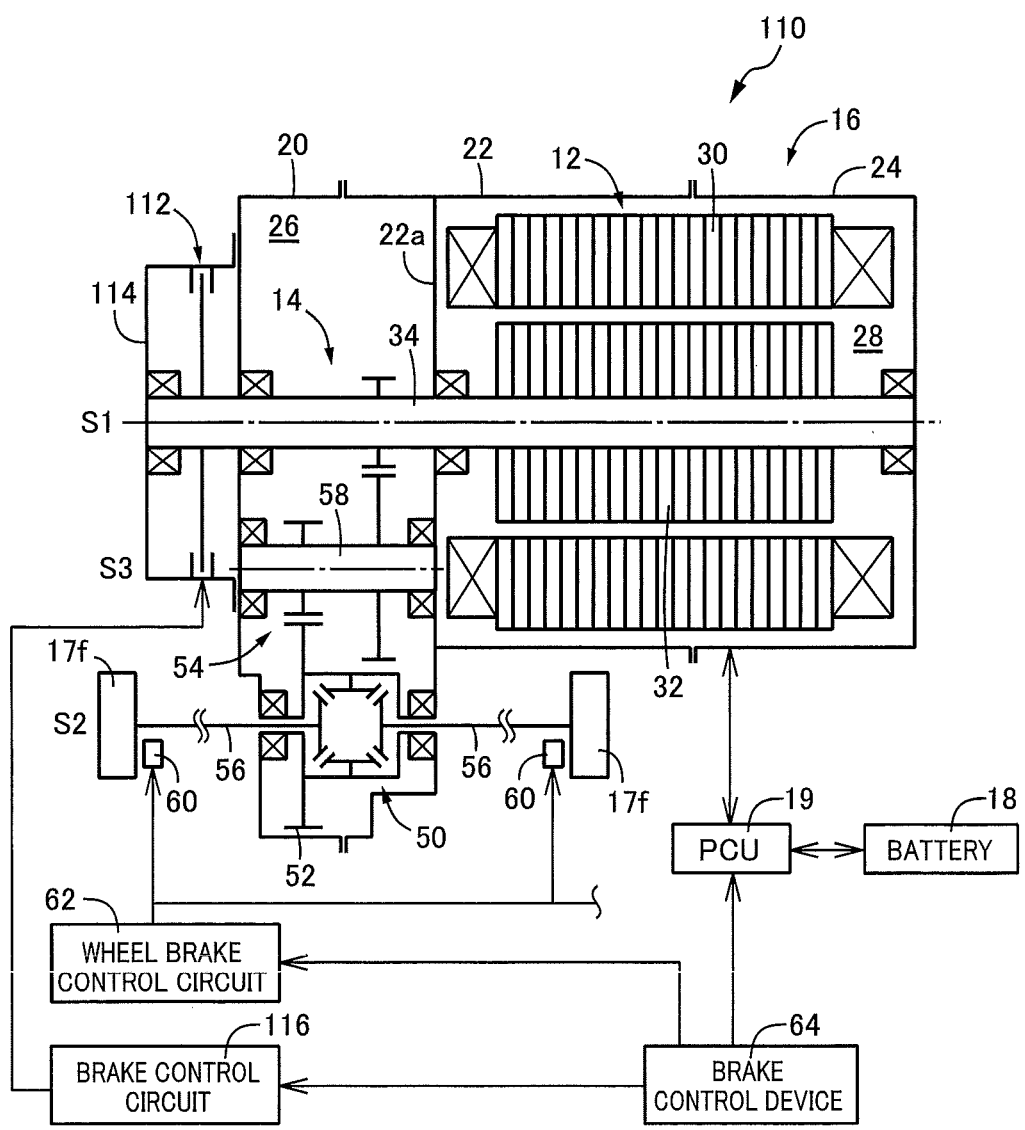
FIG. 5 is a diagram for explaining still another example of the present invention, corresponding to FIG. 2.

An electric drive unit 110 of FIG. 5 is different from the electric drive unit 10 of the first example in that a friction engagement type hydraulic brake device 112 is disposed as the third braking device. Specifically, a cover 114 housing the hydraulic brake device 112 is integrally fixed to the gear casing portion 20 of the casing 16, and the output shaft 34 of the rotating machine 12 is disposed to project into the cover 114 with the hydraulic brake device 112 disposed between the output shaft 34 and the cover 114. The hydraulic brake device 112 is a multi-plate brake, a single plate brake, a belt brake, etc., and generates a braking force corresponding to the brake hydraulic pressure supplied from a brake control circuit 116. The brake control circuit 116 is a hydraulic circuit having an electric oil pump, a hydraulic control valve, etc., similar to the wheel brake control circuit 62, and supplies the hydraulic brake device 112 with the brake hydraulic pressure for generating a predetermined braking force when the hydraulic control valve etc. are controlled in accordance with a command signal supplied from the brake control device 64.

In this case, although it is necessary to dispose an oil passage to the hydraulic brake device 112 and to dispose an electric oil pump generating a hydraulic pressure so that a structure is complicated as compared to the electromagnetic retarder 70, the same effects as the first example can be obtained in terms of the fact that the frequent use of the wheel brake 60 can be suppressed by operating the hydraulic brake device 112 even when the regenerative brake of the rotating machine 12 is unusable due to charge restriction of the battery 18 etc., that the hydraulic brake device 112 can easily be disposed as compared to when an air resistance variable means or a road surface resistance variable means is disposed, etc. Even in the electric drive unit 100 of FIG. 4, the hydraulic brake device 112 can be disposed instead of the electromagnetic retarder 70.

Fourth Example

Figure 6:
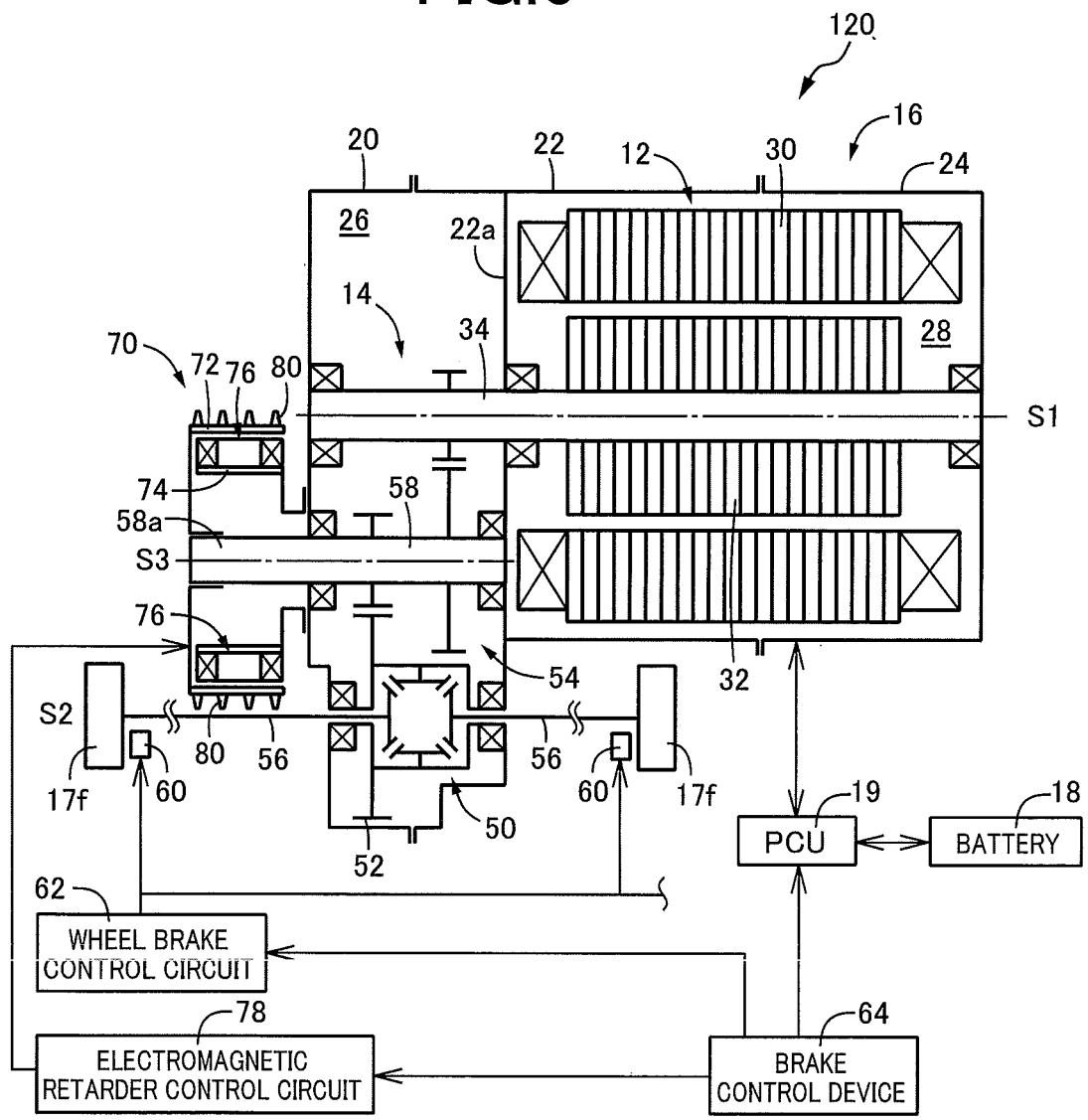
FIG. 6 is a diagram for explaining still another example of the present invention, corresponding to FIG. 2.

An electric drive unit 120 of FIG. 6 is different from the electric drive unit 10 of the first example in the arrangement position of the electromagnetic retarder 70 serving as the third braking device, and in the fourth example, the electromagnetic retarder 70 is attached to the reduction gear shaft 58. Specifically, one end portion 58a of the reduction gear shaft 58, i.e., the end portion on the side opposite to the rotating machine 12, or the end portion on the left side in FIG. 6, is extended to project from the gear casing portion 20 of the casing 16 to the outside, and the electromagnetic retarder 70 is attached to the end portion 58a. The rotating-side member 72 of the electromagnetic retarder 70 is relatively non-rotatably coupled to the end portion 58a and the fixed-side member 74 is integrally fixed to the gear casing portion 20 as in the first example.

The same effects as the first example can be obtained also in this case, and since the electromagnetic retarder 70 is disposed on the reduction gear shaft 58, the rotation speed of the electromagnetic retarder 70 is reduced as compared to when the electromagnetic retarder 70 is disposed on the output shaft 34 of the rotating machine 12 as in the first example, and a rotation balance is improved so that rotation vibration is suppressed. Therefore, this is suitably applied to an electric vehicle in which slight rotation vibrations cause a problem and an electric vehicle in which rotation vibrations easily occur due to high rotation. As with the electric drive unit 110 of FIG. 5, the hydraulic brake device 112 can be attached to the reduction gear shaft 58, instead of the electromagnetic retarder 70.

Although the examples of the present invention have been described in detail with reference to the drawings, these are merely an embodiment, and the present invention can be implemented in variously modified and improved forms based on the knowledge of those skilled in the art.

REFERENCE SIGNS LIST

8: electric vehicle (electric vehicle) 10, 100, 110, 120: electric drive unit 12: rotating machine 16: casing 17f: front wheels (wheel, drive wheels) 17r: rear wheels (wheel) 34: output shaft 50: differential device 54: gear type speed reducing mechanism (speed reducing mechanism) 58: reduction gear shaft (speed reduction shaft) 60: wheel brake 64: brake control device 70: electromagnetic retarder (third braking device) 112: hydraulic brake device (third braking device)

What is claimed is:

1. An electric vehicle comprising:
   a rotating machine selectively functioning as an electric motor and a generator, configured to serve as a drive force source in the vehicle when the rotating machine functions as the electric motor, and configured to generate a regenerative brake force when the rotating machine functions as the generator;
   a wheel brake disposed on a drive wheel, used as a service brake, and generating a braking force corresponding to a brake request amount during running of the vehicle;
   an electromagnetic retarder disposed in a power transmission path between the rotating machine and the drive wheel to generate a braking force from an eddy current generated by an electromagnetic induction action during running of the vehicle; and
   an electric drive unit including
      a differential device disposed parallel to an output shaft of the rotating machine and transmitting power to the drive wheel,
      a speed reducing mechanism which reduces and transmits a rotation of the output shaft to the differential device, and
      a casing housing the differential device and the speed reducing mechanism together with the rotating machine, wherein
   the electric drive unit is a transversely-mounted electric drive unit mounted on the vehicle in a posture in which the output shaft and the differential device are parallel to a vehicle width direction,
   the power transmission path includes a projecting portion which is extended to project from the casing to outside, and
   the electromagnetic retarder generates the braking force between the projecting portion and the casing.

2. The electric vehicle according to claim 1, wherein
   the projecting portion is provided as one end portion of the output shaft, and
   the electromagnetic retarder is provided between the projecting portion of the output shaft and the casing and applies the braking force to the output shaft.

3. The electric vehicle according to claim 1, wherein
   the speed reducing mechanism includes a speed reduction shaft which is disposed parallel to the output shaft and which a rotation of the output shaft is reduced and transmitted to, and the speed reducing mechanism further reduces and transmits a rotation of the speed reduction shaft to the differential device,
   the projecting portion is provided as one end portion of the speed reduction shaft, and
   the electromagnetic retarder is provided between the projecting portion of the speed reduction shaft and the casing and applies the braking force to the speed reduction shaft.

4. The electric vehicle according to claim 1, comprising a brake control device determining whether a regenerative control of the rotating machine is available and controlling the rotating machine and the electromagnetic retarder such that the rotating machine generates the regenerative brake force when the regenerative control is available and that the electromagnetic retarder generates the braking force when the regenerative control is unavailable.

5. The electric vehicle according to claim 2, comprising a brake control device determining whether a regenerative control of the rotating machine is available and controlling the rotating machine and the electromagnetic retarder such that the rotating machine generates the regenerative brake force when the regenerative control is available and that the electromagnetic retarder generates the braking force when the regenerative control is unavailable.

6. The electric vehicle according to claim 3, comprising a brake control device determining whether a regenerative control of the rotating machine is available and controlling the rotating machine and the electromagnetic retarder such that the rotating machine generates the regenerative brake force when the regenerative control is available and that the electromagnetic retarder generates the braking force when the regenerative control is unavailable.

7. The electric vehicle according to claim 1, wherein
   the electromagnetic retarder includes
      a cylindrical rotating-side member relatively non-rotatably coupled to the projecting portion, and
      a cylindrical fixed-side member disposed on the inner circumferential side of the rotating-side member and fixed to the casing,
   a rotation of the rotating-side member is braked due to the electromagnetic induction action, and
   an outer circumferential surface of the rotating-side member is provided with a multiplicity of cooling fins projecting to an outer circumferential side of the rotating-side member.

* * * * *